US005491008A

United States Patent [19]
Joó et al.

[11] Patent Number: 5,491,008
[45] Date of Patent: Feb. 13, 1996

[54] CELLULOSE-BASED PACKAGE MATERIAL HAVING AN INCREASED ADSORPTION CAPACITY AND PROCESS FOR THE MANUFACTURE THEREOF

[76] Inventors: Gábor Joó, Üllöi út 81., H-1091 Budapest; László Tóth, VI., Szegfü u. 63, H-2800 Tatabánya, both of Hungary

[21] Appl. No.: 129,168
[22] PCT Filed: Apr. 1, 1992
[86] PCT No.: PCT/HU92/00015
  § 371 Date: Dec. 10, 1993
  § 102(e) Date: Dec. 10, 1993
[87] PCT Pub. No.: WO92/18013
  PCT Pub. Date: Oct. 29, 1992

[30] Foreign Application Priority Data

Apr. 17, 1991 [HU] Hungary ................................ 1256/91
Mar. 23, 1992 [HU] Hungary ................................ 9407/92

[51] Int. Cl.$^6$ ............................ B29D 22/00; B65D 85/50; D21H 11/00
[52] U.S. Cl. ........................... 428/34.2; 428/182; 428/332; 428/537.5; 206/423; 162/158; 162/161; 162/168.2; 162/164.6
[58] Field of Search ..................... 428/532, 34.2, 428/174, 34.3, 35.2, 153, 154, 211, 182, 332, 340, 402, 511, 537.5, 907, 913; 162/161, 158, 164.6, 168.2; 206/423, 503; 47/58, 84

[56] References Cited

U.S. PATENT DOCUMENTS

| | | | |
|---|---|---|---|
| 4,533,435 | 8/1985 | Intili | 162/161 |
| 5,005,760 | 4/1991 | Van den Hoogen | 206/423 |
| 5,121,877 | 6/1992 | Bodary et al. | 206/503 |

OTHER PUBLICATIONS

Chemical Abstracts, vol. III, No. 9, Aug. 28, 1989, M. Uemura et al "Nitrohumic acids as preservatives for fruits and vegetables and Method of Application".

Chemical Abstracts, vol. 82, No. 19, May 12, 1975 M. Saeki et al "Preservatives of Cut Flowers by Nitrohumates".

*Primary Examiner*—Donald J. Loney
*Attorney, Agent, or Firm*—Birch, Stewart, Kolasch & Birch

[57] ABSTRACT

The invention relates to a cellulose-based package material having an increased adsorption capacity and a process for its manufacture. According to the invention, the package material is treated in a permanent manner with an aqueous suspension containing a mixture of fulvic acid and humic acid or salts thereof in the wet technological phase (step) of the paper manufacture. The treatment is carried out in the substance or on the surface of the package material during processing. The wet product obtained can subsequently be dried to a paper, paper board, cardboard, corrugated paper or other cellulose-based laminated product.

7 Claims, No Drawings

CELLULOSE-BASED PACKAGE MATERIAL HAVING AN INCREASED ADSORPTION CAPACITY AND PROCESS FOR THE MANUFACTURE THEREOF

FIELD OF THE INVENTION

This invention relates to cellulose-based package materials having an increased adsorption capacity and to a process for their manufacture. The package materials can particularly be used as containers for rapidly perishable fruits and vegetables (greens).

BACKGROUND OF THE INVENTION

A high number of methods—from cooling the items (products) to the use of plastic foils, wrappings, combined package materials with various adsorption capacity for specific gas permeability became— known in order to retard the ripening and for preserving the freshness, taste and texture of rapidly perishable fresh fruits and other vegetables. In many cases, the fruits or vegetables to be stored are treated by germicidal agents, microwave irradiation or chemicals.

Due to the hygienic prescriptions continuously becoming more and more severe it is aimed to retard the ripening of products by combining adsorptive substances of natural origin (e.g. activated carbon) with traditional package materials such as cardboard boxes and simultaneously to omit the treatment of the product to be stored in the packing of rapidly perishable foods, particularly fruits and vegetables.

It is also known that during the ripening and storage of fruits various amounts of gases and vapours having various compositions are liberated, by the enrichment of which in a closed container the ripening is accelerated and therefore, a rapid deterioration of the products to be stored is induced. Adsorbents applied to the space closed by the storage unit or container e.g. zeolites, activated carbon, silica gel, resp., are capable of retarding the ripening, or deterioration of items to a certain extent by the partial binding of the gases and vapours. However, the adsorbents used cannot be applied durably onto the surface of the known fruit package materials therefore, their use is cumbersome and laboursome.

It has also become known that the mixed potassium, sodium, magnesium or ammonium salts of humic acid as well as of nitrohumic acid prepared by the reaction of humic acid with nitric acid, which are utilized in the therapy and in the cosmetic industry, possess some activity in inhibiting rot and zymosis, and thus, they can be utilized as adsorbents applied with the package materials in the storage of fruits. The salts of humic and particularly nitrohumic acid have been used in a form filled onto or applied to felt, polyethylene foam net or paper bag and a certain grade of freshness-preserving effectivity was observed in the case of storage of fruits [C. A. 111, 76736 (1989); Japanese Pat. 64. 02,528].

SUMMARY OF THE INVENTION

The present invention has as its objective the provision of a cellulose-based package material having an increased adsorption capacity for packing fresh fruits, vegetables and green products (flowers and the like), which package materials retards the ripening and permits prolonging of the storage-life of such items while preserving their original quality.

DETAILED DESCRIPTION OF THE INVENTION

There is provided according to the present invention a cellulose-based package material having an increased adsorption capacity which has been treated in its substance or on its surface in a permanent manner with an aqueous suspension containing a mixture of fulvic acid and humic acid or their salts. The cellulose-based package material is paper, cardboard, corrugated paper board or an other cellulose-based laminated product. During the preparation of these, the suspension containing the mixture of fulvic acid and humic acid is bound to the cellulose fibres in a technological step of the paper industry, or to the cellulose fibres during sizing when fibres are still in an active wet state. The mixture of fulvic acid and humic acid is bound to the cellulose fibres by itself or mixed with other additives (auxiliaries) used in the paper industry and the final product is dried in a subsequent step.

The suspension according to the invention, which contains a mixture of fulvic acid and humic acid and is suitable to be fixed to the cellulose fibres, is a purified colloidal solution preferably recovered from brown coal, lignite or turf by dispersing these raw materials in an alkaline medium at ambient temperature, the resultant colloidal solution containing substantially particles with a size lower than 1 µm and a dry substance content of 4–5% by weight and a strongly alkaline pH. The dry substance thereof giving the following analysis: C: 40–42%; H: 3.61– 4.0%; N: 0.73–1.0%; O: 42.0–44%.

Due to the structural analogy between humic acids and fulvic acids, the higher proportion of fulvic acids in the mixture can be concluded by the statistical distribution of the elemental analysis [F. J. Stevenson: "Humus Chemistry, Genesis, Composition, Reactions", Wiley, N.Y. (1982)].

The process according to the invention for the preparation of cellulose-based package materials having an increased adsorption capacity is characterized by adding portionwise in the wet phase of the paper manufacture, in a quantity of at least 0.5% by weight, preferably 3–5% by weight of a mixture of fulvic acid and humic acid as calculated for the dry material content of the paper to be manufactured. The mixture of acids is in the form of a colloidal aqueous solution, and is applied to a fibre suspension or a fibre web present on a sizing press, and then processing and drying the paper web to obtain sheet or (paper) boards in a known manner.

The aqueous suspension having an alkaline pH value and containing the mixture of fulvic acid and humic acid can portionwise be added together with fillers in the wet phase of the paper manufacture during the sizing simultaneously with the addition of additives (auxiliaries) used in the paper industry.

The addition of the additive in the form of an aqueous colloidal solution containing the humic acid and fulvic acid in each case is carried out prior to the paper-drying step. The addition may be performed in the cellulose-manufacturing phase in the pulp mill where starting materials for the paper industry are obtained, however, the treatment may be achieved also by immersing the paper web into an aqueous treating suspension, e.g. on the sizing press followed by drying. Metal salts, particularly aluminium salts used in the paper making favourably contribute to the fixation of humic acids and fulvic acids or their salts respectively to cellulose fibres.

The effectivity of the cellulose-based package materials having an increased adsorption capacity manufactured according to the invention, inter alia their capability to bind the gases and vapours liberated from fruits has been tested by fruit storage experiments. It is noted that the adhesiveness of the cellulose-based package materials is not influenced by the treatment according to the invention, whereas the strength of the paper product is enhanced by 20%.

The process according to the invention is illustrated by the following Examples.

EXAMPLE 1

The suspension suitable for treating the cellulose-based paper materials was prepared with a dry material content of 4–5% by dispersing the raw material containing fulvic acid and humic acid in an alkaline medium at ambient temperature. According to the particle size distribution, the dark brown-coloured colloidal solution of 11–12 pH value contained particles of lower than 1 μm in size in an amount 65% and between 1 μm and 1.2 μm in an amount of 23–25%. The zeta potential of the dispersed particles was found to be −20 mV. The suspension did not settle during storage, the colloidal particles could be sedimented only by applying about 15000×g.

Values of elemental analysis calculated for the free acid and related to the solid material are as follows:

C: 40.50%
H: 3.61%
O: 42.1%
N: 0.75%

Elemental analysis values cited in the literature are as follows:

|   | Fulvic acid | Humic acid |
|---|---|---|
| C | 40–50% | 50–60% |
| H | 4–6% | 4–6% |
| O | 44–50% | 30–35% |
| N | 1–3% | 2–6% |

The oxygen consumption of the suspension used was measured by an indirect method. Iodine solution was added to the suspension which was reduced according to the reaction: $J_2 \rightarrow 2\ J^-$ and the iodine not consumed in the oxidation was titrated to the end point by using 0.1 N sodium thiosulfate solution.

The consumption (given in ml) of 0.1 N sodium thiosulfate solution indicated the oxidability of the solution and is characteristic of the composition:

| Suspension used (ml) | Consumption of 0.1N sodium thiosulfate solution (ml) |
|---|---|
| 1 | 8.4 |
| 2 | 7.8 |
| 3 | 7.1 |
| 5 | 6.2 |

EXAMPLE 2

100 g of cellulose-based fibre material (dry substance content) containing 30% by weight of unbleached fir sulfate cellulose and 70% by weight of paper waste in a suspension of 5% by weight was ground to 24 SR°, then 2 g of Dynakoll HV strengthened resin were added as a solution of 4% by weight. Subsequently, 100 g of gelated starch with a dry material content of 1% by weight were portionwise added, the pH value of the mixture was adjusted to 4.5 by adding an aluminium sulfate solution of 12 Baumé degrees and then 100 g of a mixture of fulvic acid and humic acid of 11.0 pH value with a dry material content of 5% by weight were added in a disintegrator under continuously stirring. Thereafter, sheets were prepared in a laboratory sheet-forming device.

This example was repeated by using 50, 25 and 12.5 g, respectively of a suspension containing the mixture of fulvic acid and humic acid.

EXAMPLE 3

The aqueous suspension according to Example 1 containing the mixture of fulvic acid and humic acid was portionwise added in an amount (dose) of 0.8 litre of suspension per 1 kg of fibre to a paper fibre suspension used as a coating layer for corrugated paper-box manufacture. In an other experiment the suspension containing the mixture of humic acid and fulvic acid was portionwise added on the sizing press instead of starch in an amount of 3–5% by weight calculated for the dry material content.

It was concluded that, when applied on the sizing press, a substantial part of the additive was fixed on the paper surface, whereas, when added to the fibre suspension, it was observed that the additive was nearly evenly distributed over the cross-section of the paper.

EXAMPLE 4

The effect of the cellulose-based package material treated according to the invention was tested on fruits packed in corrugated cardboard boxes prepared with a coating paper obtained according to Example 3. Since the liberation of gas was expected during the storage, the effect asserts itself in a closed container. The paper surface should be in contact with the atmosphere of the fruit during storage. It should be noted that no decrease of the adsorption capacity of an air-stored package material sample has been observed even after 6 months. Therefore, it can be expected that the specific inhibitory action of the treated paper is durable.

The functional properties, sizing, strength features (characteristics) and adhesiveness of the package material were not disadvantageously influenced by the additive introduced.

The reductive effect (capacity) of the paper treated with the additive according to the invention in comparison to an untreated paper was examined by determining its decolouring effect on methylene blue (according to the Hungarian standard MSZ No. 6230-57). The methylene blue solution was used in a concentration of 8 ug/ml with an adsorption maximum at 645 μm.

Control and treated paper, respectively of 1 g each were placed in a flask of 100 ml volume, shaken together with 50 ml of aqueous methylene blue solution, allowed to stand for 15, 30 or 60 seconds, respectively and after extraction the solution was examined spectrophotometrically. The adsorbance of methylene blue, i.e. $A_{645\ \mu m}$ was found to be 0.90 before the measurement.

|   | 15 | After 30 seconds | 60 |
|---|---|---|---|
| Untreated paper | 0.66 | 0.52 | 0.49 |

|  | 15 | After 30 seconds | 60 |
|---|---|---|---|
| Treated paper | 0.47 | 0.33 | 0.31 |

According to the examination of the decolouring effect, a significant difference appeared between the treated and untreated sample after extraction lasting for a very short time.

Boxes of 225×165×110 mm in size were prepared from paper board treated according to the invention and from control paper board, respectively. The same weights of unripe peach, banana, ripe strawberry and mushroom, respectively were packed into the boxes and then stored at 20° C. for 0–14 days.

The concentrations of methanol, ethanol, ethyl acetate and butyl acetate in the closed storage atmosphere of the fruits were tested by using a Packard 5880 A type gas chromatograph. The outer appearance and change of fruits were visually observed.

Results:

Strawberry (0.7 kg of fruit in each box) showed a shining red light in the treated box on the 5th day whereas the control was dull-red, shrivelled with many mouldy individual items.

Peach (0.75 kg of half-ripe fruit in each package material): the fruit stored for 10 days in the treated box was still greenish-coloured and the ripening process was perceptibly inhibited in comparison to the control.

Banana (0.8 kg of unripe, green-coloured fruit in each box): the control was yellowish on the 3rd day of storage and quite ripe-yellow on the 7th and 9th days whereas the fruit remained greenish and became slightly yellowish on its one side in the treated box.

Mushroom (0.25 kg of smaller items cultivated agaric (Agaricus bisporus) placed in each package material): the mushroom in the control box became brownish, the caps (pileus) of the mushrooms were strongly opened and the larger ones became mouldy up to the 7th day of storage. The caps of the mushrooms were hardly or not opened and no brown colour was observed in the treated box.

In the mushroom storage experiment, the hydrolysis of proteins occurred in the substance was followed by measuring the decrease in the weight and intensity of protein molecules. The distribution of mushroom proteins was determined by gel electrophoresis on SDS-(sodium decyl sulfate)-polyacryl-amide.

The respiratory intensity of fruits stored in several package materials were various. For this reason, the gas composition of the atmosphere in the container was not uniform but characteristic to the stored fruit sorts.

In the control of ripening, the biochemical changes connected with the enzyme synthesis are essential. The package materials treated according to the invention obviously inhibits the enzyme synthesis and simultaneously the process of ripening.

We claim:

1. A cellulose-based package material having an increased absorption capacity, comprising:

cellulose fibers having in their substance, or on their surface a mixture of fulvic acid and humic acid, or a salt thereof, provided that the cellulose fibers have been treated with an aqueous colloidal solution containing the mixture of fulvic acid and humic acid, or the salt thereof, and wherein the solution has a dry material content of 4–5% by weight and a strongly alkaline pH value of 11–12.

2. The cellulose-based package material according to claim 1, wherein the material is selected from a cardboard, a corrugated paper or a cellulose based laminated product.

3. The cellulose-based package material according to claim 1, wherein the cellulose fibers are treated with the aqueous colloidal solution during a wet phase step of manufacturing the cellulose-based package material, and wherein the wet phase step occurs prior to a step of drying said cellulose-based package material.

4. The cellulose-based package material according to claim 1, wherein the colloidal solution is a purified colloidal solution containing a mixture of fulvic acid and humic acid, which is obtained by digesting a raw material containing brown coal, lignite or turf in an alkaline medium at ambient temperatures, to give particles being less than 1 micron in size, and an elemental analysis of the dry digested material being as follows: C: 40–42%, H: 3.6–4.0%, N: 0.75–1.0%, O: 42.0–44.0%.

5. In a process for the manufacture of a cellulose-based package material having an increased adsorption capacity, the improvement of carrying out the sequential steps of:

(a) adding to a fiber suspension or a fiber web a colloidal solution containing a mixture of fulvic acid and humic acid, or a salt thereof, in a quantity of at least 0.5% by weight, as calculated on the dry material weight of the cellulose-based package material to be manufactured; and (b) drying the fiber suspension or the fiber web.

6. The process according to claim 5, wherein the colloidal solution containing the mixture of fulvic acid and humic acid, or the salt thereof, is added to the fiber suspension or the fiber web during a wet phase step of manufacturing the cellulose-based package material, wherein the wet phase step occurs prior to a step of drying said cellulose-based package material.

7. The process according to claim 5, wherein the colloidal solution contains a mixture of fulvic acid and humic acid, or the salt thereof, in a quantity of 3–5% by weight, as calculated on the dry material weight of the cellulose-based package material to be manufactured.

* * * * *